(12) United States Patent
Baker et al.

(10) Patent No.: US 12,030,995 B2
(45) Date of Patent: Jul. 9, 2024

(54) METHOD OF MAKING THERMOPLASTIC ELASTOMER CORK COMPOSITE

(71) Applicant: Edge Marketing Corp., Vancouver (CA)

(72) Inventors: Michael Baker, Vancouver (CA); Jordan Palmer, Vancouver (CA)

(73) Assignee: Edge Marketing Corp., Vancouver (CA)

( * ) Notice: Subject to any disclaimer, the term of this patent is extended or adjusted under 35 U.S.C. 154(b) by 432 days.

(21) Appl. No.: 17/161,188

(22) Filed: Jan. 28, 2021

(65) Prior Publication Data

US 2021/0221963 A1 Jul. 22, 2021

Related U.S. Application Data

(63) Continuation of application No. PCT/CA2019/051062, filed on Aug. 1, 2019.
(Continued)

(51) Int. Cl.
*C08J 3/12* (2006.01)
*C09D 109/06* (2006.01)

(52) U.S. Cl.
CPC ............ *C08J 3/126* (2013.01); *C09D 109/06* (2013.01); *C08J 2397/00* (2013.01)

(58) Field of Classification Search
CPC ... B27K 7/00; B27K 5/001; B27J 5/00; Y10T 428/2991; Y10T 428/2998; Y10T 428/3167; C08J 3/126
See application file for complete search history.

(56) References Cited

U.S. PATENT DOCUMENTS 903,865 A * 11/1908 Jones ...................... C08B 1/003
264/109
1,591,018 A * 7/1926 Cutler ................... C08L 97/007
524/928
(Continued)

FOREIGN PATENT DOCUMENTS

CN 200973423 11/2007
CN 105643756 6/2016
(Continued)

OTHER PUBLICATIONS

Translation JP-2017171824-A (Year: 2017).*
(Continued)

*Primary Examiner* — Hoa (Holly) Le
(74) *Attorney, Agent, or Firm* — Todd A. Rattray; Oyen Wiggs Green & Mutala LLP

(57) ABSTRACT

A method of fabricating a cork composite material and a cork composite material. The method may comprise providing a plurality of cork particles in a volume and adding a dispersion of thermoplastic elastomer to the volume to provide a mixture of the dispersion of thermoplastic elastomer and the cork particles. The method may comprise agitating the cork particles and/or the mixture of the dispersion of thermoplastic elastomer and the cork particles and heating the mixture of the thermoplastic elastomer and the cork particles. The method may comprise allowing the mixture of the thermoplastic elastomer and the cork particles to cool. The steps of the method together may result in a plurality of coated cork particles being coated in a first layer of the thermoplastic elastomer.

18 Claims, 12 Drawing Sheets

Related U.S. Application Data

(60) Provisional application No. 62/713,979, filed on Aug. 2, 2018.

(56) References Cited

U.S. PATENT DOCUMENTS

| | | | |
|---|---|---|---|
| 2,884,060 | A | 4/1959 | Kao |
| 2,884,860 | A | 5/1959 | Ellis |
| 3,238,173 | A | 3/1966 | Bailey et al. |
| 3,549,472 | A | 12/1970 | King et al. |
| 4,042,543 | A * | 8/1977 | Strickman ............... C08L 23/06 |
| | | | 215/355 |
| 5,317,047 | A | 5/1994 | Sabate et al. |
| 6,288,159 | B1 | 9/2001 | Plamthottam |
| 6,716,911 | B2 | 4/2004 | Doi et al. |
| 6,861,128 | B1 | 3/2005 | Müller et al. |
| 9,220,238 | B2 | 12/2015 | Tsengas |
| 2005/0165138 | A1 | 7/2005 | Holmes et al. |
| 2012/0273496 | A1 | 11/2012 | Lourido et al. |
| 2014/0224759 | A1 | 8/2014 | Aagaard et al. |
| 2015/0259492 | A1 | 9/2015 | Zur et al. |
| 2017/0288211 | A1 | 10/2017 | Zhamu et al. |
| 2019/0135498 | A1* | 5/2019 | Thometschek ....... C08L 97/007 |
| 2019/0135499 | A1* | 5/2019 | Thometschek ............ C08J 9/32 |
| 2019/0135500 | A1* | 5/2019 | Thometschek ..... B29C 48/0022 |
| 2019/0136063 | A1* | 5/2019 | Thometschek .... B65D 39/0058 |
| 2020/0017688 | A1 | 1/2020 | Weinkoetz et al. |

FOREIGN PATENT DOCUMENTS

| | | | | |
|---|---|---|---|---|
| CN | 108047738 | A * | 5/2018 | .............. C08L 27/06 |
| EP | 2053093 | B1 | 6/2017 | |
| EP | 4212297 | A1 * | 7/2023 | .............. B27N 1/00 |
| JP | 2001009936 | A | 1/2001 | |
| JP | 2002309096 | A | 10/2002 | |
| JP | 2017171824 | | 9/2017 | |
| JP | 2017171824 | A * | 9/2017 | |
| JP | 2017171824 | A | 9/2017 | |
| WO | 2005/003216 | A1 | 1/2005 | |
| WO | 2009/072914 | A1 | 6/2009 | |
| WO | 2017/164757 | A1 | 9/2017 | |

OTHER PUBLICATIONS

Translation CN-200973423-Y (Year: 2007).*
Translation CN-105643756 (Year: 2015).*
McMullin et al., Biodegradable Thermoplastic Elastomers Incorporating POSS: Synthesis, Microstructure, and Mechanical Properties, Macromolecules 2016, 49, 10, 3769-3779 (Year: 2016).*
Holden, Thermoplastic Elastomers.Applied Plastics Engineering Handbook, Processing and Materials, Plastics Design Library 2011, pp. 77-91 (Year: 2011).*
Translation JP-2001 009936A (Year: 2001).*

* cited by examiner

METHOD OF MAKING THERMOPLASTIC
ELASTOMER CORK COMPOSITE

REFERENCE TO RELATED APPLICATIONS

This application is a continuation of Patent Cooperation Treaty (PCT) application No. PCT/CA2019/051062 filed 1 Aug. 2019, which in turn claims priority to U.S. application No. 62/713,979 filed 2 Aug. 2018. For purposes of the United States, this application claims the benefit under 35 U.S.C. § 119 of application No. 62/713,979, filed 2 Aug. 2018. PCT application No. PCT/CA2019/051062 and U.S. application No. 62/713,979 are both hereby incorporated herein by reference.

TECHNICAL FIELD

The application relates to cork composite materials. More specifically, aspects of the invention relate to thermoplastic elastomer cork composite materials.

BACKGROUND

Cork is a versatile natural material. Raw cork is lightweight, elastic, flexible, impermeable to gases or liquids and imperishable. Raw cork is a good electrical, thermal, acoustic and vibrational insulator. These unique properties of cork arise from its closed cell structure. The cells of cork are filled with a gas mixture similar to air which contributes to the capability of cork to recover after compressed. These mechanical properties of cork combined with it being a natural, renewable, and recyclable material make cork desirable for a variety of applications.

In its raw form, cork may not be available in desired shapes and sizes. Further, in its raw form, cork may not be easily manipulated to form desired shapes and sizes. As such, it is common to employ cork agglomerates made up of natural cork particles bonded together. However, common articles manufactured from agglomerated cork tend to be too fragile, too rigid, too hard, and/or too heavy for many applications. Additionally, there is little to no ability to control and/or adjust density levels or cushioning properties of a given cork composite.

Existing binding agents typically bond with cork in such a way that the resulting mechanical properties of the composite material and finished components fabricated from such composite material are dependent on and are limited by the mechanical properties of the cork itself, without benefiting from the mechanical properties of the polymer matrix material. Thus, the mechanical properties of the finished component are no better than a component of the same form, made entirely from solid cork.

Conversely, existing binding agents can bond with cork in such a way that the resulting mechanical properties of the composite material and finished components fabricated from such composite material are dependent on and are limited by the mechanical properties of the polymer matrix itself, without benefitting from the mechanical properties of cork. Thus, the mechanical properties of the finished component may be no better than a component of the same form, made entirely from solid polymer.

Polyurethane cork composites can be either low or high density. Low density polyurethane-based cork composites are typically easily damaged or broken and are soft and fragile. On the other hand, high density polyurethane-based cork composites are less fragile, but, consequently, are rigid.

Latex based cork composites typically use minimal amounts of raw cork. As such, the mechanical properties of the final composite material and finished components fabricated from such composite material are largely dependent on the mechanical properties of the polymer matrix. Further, vulcanized latex is dark and only moderately translucent such that the finished article may not be visually identifiable as cork.

There is a general desire for cork composites that are easy to manufacture, moldable, and have desirable and controllable mechanical properties (e.g. density, strength, elasticity, etc.). There is a general desire for cork composites that are softer, more flexible and more durable than natural cork. There is a general desire for cork composites that are at least roughly as soft, flexible and durable as synthetic foams used, for example, in footwear.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method of fabricating a cork composite material. The method may comprise (a) providing a plurality of cork particles in a volume; (b) adding a dispersion of thermoplastic elastomer to the volume to provide a mixture of the dispersion of thermoplastic elastomer and the cork particles; (c) agitating the mixture of the dispersion of thermoplastic elastomer and the cork particles; (d) heating the mixture of the thermoplastic elastomer and the cork particles; and (e) allowing the mixture of the thermoplastic elastomer and the cork particles to cool. Steps (a), (b), (c), (d) and (e) together may result in a plurality of coated cork particles being coated in a first layer of the thermoplastic elastomer.

In some embodiments, the method may comprise (f) adding a dispersion of thermoplastic elastomer to the volume to provide a mixture of the dispersion of thermoplastic elastomer and the coated cork particles; (g) agitating the mixture of the dispersion of thermoplastic elastomer and the coated cork particles; (h) heating the mixture of the thermoplastic elastomer and the coated cork particles; and (i) allowing the mixture of the thermoplastic elastomer and the coated cork particles to cool. Steps (f), (g), (h) and (i) together may result in the plurality of coated cork particles being coated in a second layer of the thermoplastic elastomer.

In some embodiments, the method comprises repeating steps (f), (g), (h) and (i) for the plurality of coated cork particles until the cork composite material has a composition between 30% and 80% thermoplastic elastomer by weight. In some embodiments, the method comprises repeating steps (f), (g), (h) and (i) for the plurality of cork particles until the cork composite material has a composition of the cork composite is between 60% and 80% thermoplastic elastomer by weight. In some embodiments, the method comprises repeating steps (f), (g), (h) and (i) for the plurality of cork particles until the cork composite material has a composition of the cork composite is between 70% and 90% cork particles by volume. In some embodiments, the method comprises repeating steps (f), (g), (h) and (i) for the plurality of cork particles until the cork composite material has a composition between 75% and 85% cork particles by volume.

In some embodiments, each of the plurality of cork particles has a maximal dimension of between 0.5 mm and 2.0 mm. In some embodiments, each of the plurality of cork particles has a maximal dimension of between 0.5 mm and 1.0 mm. In some embodiments, 90% of the plurality of cork particles, by number of particles, have a maximal dimension of between 0.5 mm and 2.0 mm. In some embodiments, 90% of the plurality of cork particles, by number of particles, have a maximal dimension of between 0.5 mm and 1.0 mm. In some embodiments, each of the plurality of cork particles has been passed through a sieve having circular openings each having a diameter of less than or equal to 2.0 mm. In some embodiments, each of the plurality of cork particles has been passed through a sieve having circular openings each having a diameter of less than or equal to 1.0 mm.

In some embodiments, each cork particle is encapsulated in between 5 and 12 layers of the thermoplastic elastomer. In some embodiments, each cork particle is encapsulated in between 10 and 20 layers of the thermoplastic elastomer.

In some embodiments, the thermoplastic elastomer comprises styrene-ethylene-butadiene-styrene polymer. In some embodiments, the thermoplastic elastomer comprises styrene-butylene-styrene polymer. In some embodiments, the thermoplastic elastomer comprises styrene-ethylene-butylene-styrene polymer. In some embodiments, the thermoplastic elastomer comprises styrene-butadiene-styrene polymer. In some embodiments, the thermoplastic elastomer comprises a bio-polymer. In some embodiments, the thermoplastic elastomer comprises a corn-based bio-polymer. In some embodiments, the thermoplastic elastomer comprises an algae oil-based bio-polymer. In some embodiments, the thermoplastic elastomer comprises an ethanol-based bio-polymer.

In some embodiments, the method comprises adding a dispersion of thermoplastic elastomer to the volume comprises spraying the dispersion of thermoplastic elastomer into the volume.

In some embodiments, the volume is defined by a cavity of a rotating drum and agitating the mixture of the dispersion of thermoplastic elastomer and the cork particles comprises mixing the mixture of the dispersion of thermoplastic elastomer and the cork particles in the rotating drum.

In some embodiments, the dispersion of thermoplastic elastomer comprises an aqueous dispersion of thermoplastic elastomer. In some embodiments, the dispersion of thermoplastic elastomer comprises an oil-based dispersion of thermoplastic elastomer. In some embodiments, the dispersion of thermoplastic elastomer comprises a solvent-based dispersion of thermoplastic elastomer.

In some embodiments, heating the mixture of thermoplastic elastomer and the cork particles comprises heating the mixture of the thermoplastic elastomer and the cork particles to at least 60° C. In some embodiments, heating the thermoplastic elastomer and the cork particles comprises heating the mixture of the thermoplastic elastomer and the cork particles to at least 65° C. In some embodiments, heating the mixture of the thermoplastic elastomer and the cork particles comprises heating the mixture of the thermoplastic elastomer and the cork particles to at least 70° C. In some embodiments, heating the mixture of the thermoplastic elastomer and the cork particles comprises heating the mixture of the thermoplastic elastomer until the humidity in the volume is below 10%. In some embodiments, heating the mixture of the thermoplastic elastomer and the mixture of the cork particles comprises heating the thermoplastic elastomer until the humidity in the volume is below 5%.

In some embodiments, allowing the mixture of the thermoplastic elastomer and the cork particles to cool comprises allowing the mixture of the thermoplastic elastomer and the cork particles to cool below 55° C. In some embodiments, allowing the mixture of the thermoplastic elastomer and the cork particles to cool comprises allowing the mixture of the thermoplastic elastomer and the cork particles to cool below 50° C. In some embodiments, allowing the mixture of the thermoplastic elastomer and the cork particles to cool comprises actively cooling the mixture of the thermoplastic elastomer and the cork particles by blowing air into the volume.

In some embodiments, the method comprises agitating the mixture of the dispersion of thermoplastic elastomer and the cork particles while adding the dispersion of thermoplastic elastomer to the volume. In some embodiments, the method comprises continuing to agitate the mixture of the thermoplastic elastomer and the cork particles while heating the mixture of the thermoplastic elastomer and the cork particles. In some embodiments, the method comprises continuing to agitate the mixture of the thermoplastic elastomer and the cork particles while allowing the mixture of the thermoplastic elastomer and the cork particles to cool.

In some embodiments, adding the mixture of the dispersion of thermoplastic elastomer to the cork particles comprises adding the mixture of the dispersion of thermoplastic elastomer to the volume at a ratio of between 1.25:1 and 5:1 cork particles to dispersion of thermoplastic elastomer by weight.

In some embodiments, for step (b), a first amount of the dispersion of thermoplastic elastomer is added to the volume and for step (f), a second amount of the dispersion of thermoplastic elastomer is added to the volume, wherein the second amount is less than the first amount. In some embodiments, the second amount is less than the first amount by between 12% and 40% by weight.

Another aspect of the invention provides a method for fabricating at least a portion of a midsole of a piece of footwear. The method may comprise a method of fabricating a cork composite material as described herein. In some embodiments, the method comprises introducing the plurality of coated cork particles into a mold to form at least a portion of a midsole of a piece of footwear. In some embodiments, the method comprises applying pressure to the plurality of coated cork particles in the mold. In some embodiments, the method comprises applying heat to the plurality of coated cork particles in the mold.

Another aspect of the invention provides a cork composite material. The cork composite material may comprise a plurality of cork particles, wherein each cork particle is encapsulated in a thermoplastic elastomer.

In some embodiments, each of the plurality of cork particles has a maximal dimension of between 0.5 mm and 2.0 mm. In some embodiments, each of the plurality of cork particles has a maximal dimension of between 0.5 mm and 1.0 mm. In some embodiments, 90% of the plurality of cork particles, by number of cork particles, have a maximal dimension of between 0.5 mm and 2.0 mm. In some embodiments, 90% of the plurality of cork particles, by number of cork particles, have a maximal dimension of between 0.5 mm and 1.0 mm. In some embodiments, each of the plurality of cork particles has been passed through a sieve having circular openings, each opening having a diameter of less than or equal to 2.0 mm. In some embodiments, each of the plurality of cork particles has been passed through a sieve having circular openings, each opening having a diameter of less than or equal to 1.0 mm.

In some embodiments, a composition of the cork composite is between 50% and 80% thermoplastic elastomer by weight. In some embodiments, a composition of the cork composite is between 70% and 80% thermoplastic elastomer by weight. In some embodiments, a composition of the cork composite is between 70% and 90% cork particles by volume. In some embodiments, a composition of the cork composite is between 75% and 85% cork particles by volume.

In some embodiments, each cork particle is encapsulated in a plurality of layers of the thermoplastic elastomer. In some embodiments, each cork particle is encapsulated in between 10 and 20 layers of layers of the thermoplastic elastomer. In some embodiments, each cork particle is encapsulated in between 5 and 12 layers of layers of the thermoplastic elastomer.

In some embodiments, the thermoplastic elastomer comprises styrene-ethylene-butylene-styrene polymer. In some embodiments, the thermoplastic elastomer comprises styrene-ethylene-butadiene-styrene polymer. In some embodiments, the thermoplastic elastomer comprises styrene-butadiene-styrene polymer. In some embodiments, the thermoplastic elastomer comprises styrene-butylene-styrene polymer. In some embodiments, the thermoplastic elastomer comprises a bio-polymer. In some embodiments, the thermoplastic elastomer comprises a corn-based bio-polymer. In some embodiments, the thermoplastic elastomer comprises an algae oil-based bio-polymer. In some embodiments, the thermoplastic elastomer comprises an ethanol-based bio-polymer.

In some embodiments, the cork composite material has a durometer of between 20 Asker C and 80 Asker C. In some embodiments, the cork composite material has a durometer of between 40 Asker C and 80 Asker C. In some embodiments, the cork composite material has an average elastic modulus of between 1.0 MPa and 5.0 MPa. In some embodiments, the cork composite material has an average elastic modulus of between 1.41 MPa and 4.06 MPa. In some embodiments, the cork composite material has a specific gravity of between 0.20 gm/cm$^{-3}$ and 0.47 gm/cm$^{-3}$. In some embodiments, the cork composite material has a specific gravity of between 0.29 gm/cm$^{-3}$ and 0.47 gm/cm$^{-3}$. In some embodiments, the cork composite material has an energy return percentage of between 43% and 46%.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a cork composite material. In some embodiments, the cork composite material comprises a plurality of cork particles coated or encapsulated in a thermoplastic elastomer. In some embodiments, the cork composite material comprises a plurality of cork composite granules wherein each cork composite granule comprises a cork particle coated or encapsulated in a thermoplastic elastomer. In some embodiments, the cork composite material comprises a plurality of cork particles embedded in a thermoplastic elastomer matrix.

Another aspect of the invention provides a method for fabricating a cork composite material and/or cork composite granules. In some embodiments, the method comprises (a) providing a plurality of cork particles in a volume; (b) adding a dispersion of thermoplastic elastomer to the volume to provide a mixture of the dispersion of thermoplastic elastomer and the cork particles; (c) agitating the mixture of the dispersion of thermoplastic elastomer and the cork particles; (d) heating the mixture of the thermoplastic elastomer and the cork particles; and (e) allowing the mixture of the thermoplastic elastomer and the cork particles to cool. Steps (a), (b), (c), (d) and (e) together may result in a plurality of coated cork particles being coated in a first layer of the thermoplastic elastomer. In some embodiments, the method may comprise (f) adding a dispersion of thermoplastic elastomer to the volume to provide a mixture of the dispersion of thermoplastic elastomer and the coated cork particles; (g) agitating the mixture of the dispersion of thermoplastic elastomer and the coated cork particles; (h) heating the mixture of the thermoplastic elastomer and the coated cork particles; and (i) allowing the mixture of the thermoplastic elastomer and the coated cork particles to cool. Steps (f), (g), (h) and (i) together may result in the plurality of coated cork particles being coated in a second layer of the thermoplastic elastomer.

Figure 1:
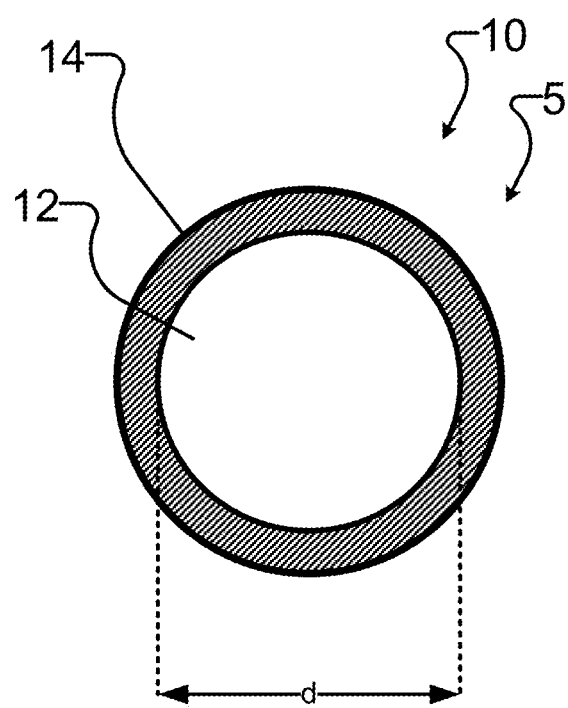
FIG. 1 is a schematic diagram of a cross-section of a cork composite granule according to one exemplary embodiment of the invention.

Aspects of the invention provide a cork composite material 5 comprising a plurality of cork composite granules 10 (one of which is schematically depicted in FIG. 1). Each cork composite granule 10 comprises a cork particle 12 coated or encapsulated in polymer 14. FIG. 1 is a schematic depiction of a cross-section of an exemplary cork composite granule 10 comprising a cork particle 12 coated or encapsulated by a polymer 14. It should be understood that while cork particle 12 is depicted as being circular in cross-section, this is a schematic representation and is not mandatory. Cork particle 12 may have any cross-sectional shape. Furthermore, an exterior surface of cork particle 12 is not necessarily smooth as depicted and may have variations in texture and surface roughness. Similarly, it should be understood that while the polymer 14 coating of cork composite granule 10 is depicted as being circular in cross-section, this is a schematic representation and is not mandatory. Cork composite granule 10 may have any cross-sectional shape. Furthermore, an exterior surface of cork composite granule 10 is not necessarily smooth as depicted and may have variations in texture and surface roughness.

Figure 4:
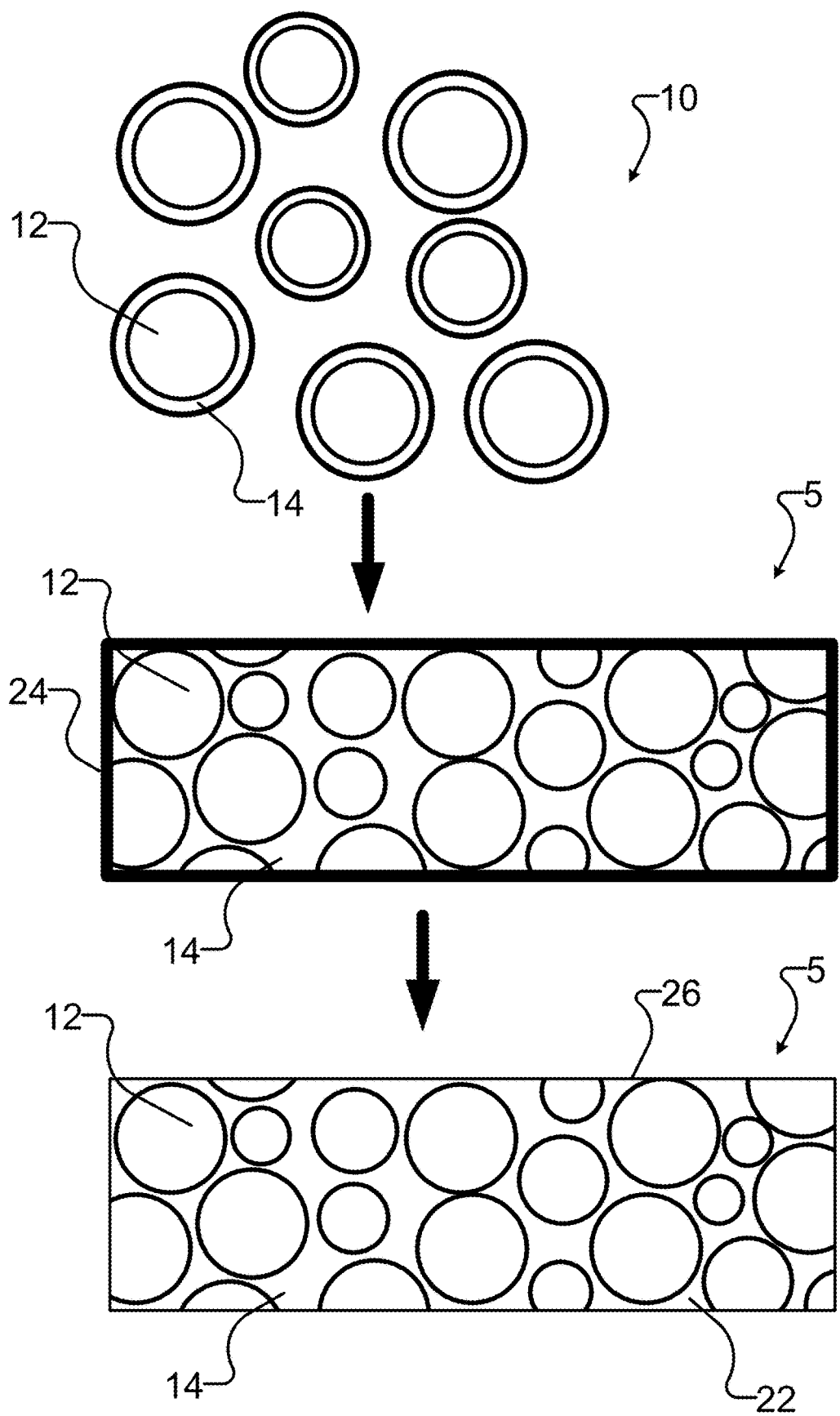
FIG. 4 is a schematic diagram of a method for manufacturing with a cork composite material according to one exemplary embodiment of the invention.

Cork composite material 5 may comprise a plurality of cork particles 12 embedded in a matrix 22 of polymer 14 (as shown in the schematic depiction of FIG. 4). In some embodiments, cork composite granules 10 (as shown, for example, in FIG. 1) are the product of an intermediate step in a process for manufacturing a cork composite material 5 comprising a plurality of cork particles 12 embedded in a matrix 22 of polymer 14.

Cork composite material 5 and/or granules 10 thereof may be fabricated using a variety of methods. Cork particles 12 may be coated in polymer 14 by chemical methods (e.g. using solvents), physiochemical methods or physical methods. For example, non-limiting examples of physical methods for coating polymer 14 onto cork particles 12 include air suspension (e.g. in a fluidized bed reactor), spray drying, spray congealing, granulation or pan coating (e.g. dispersion based pan coating or hot melt spray).

Figure 2:
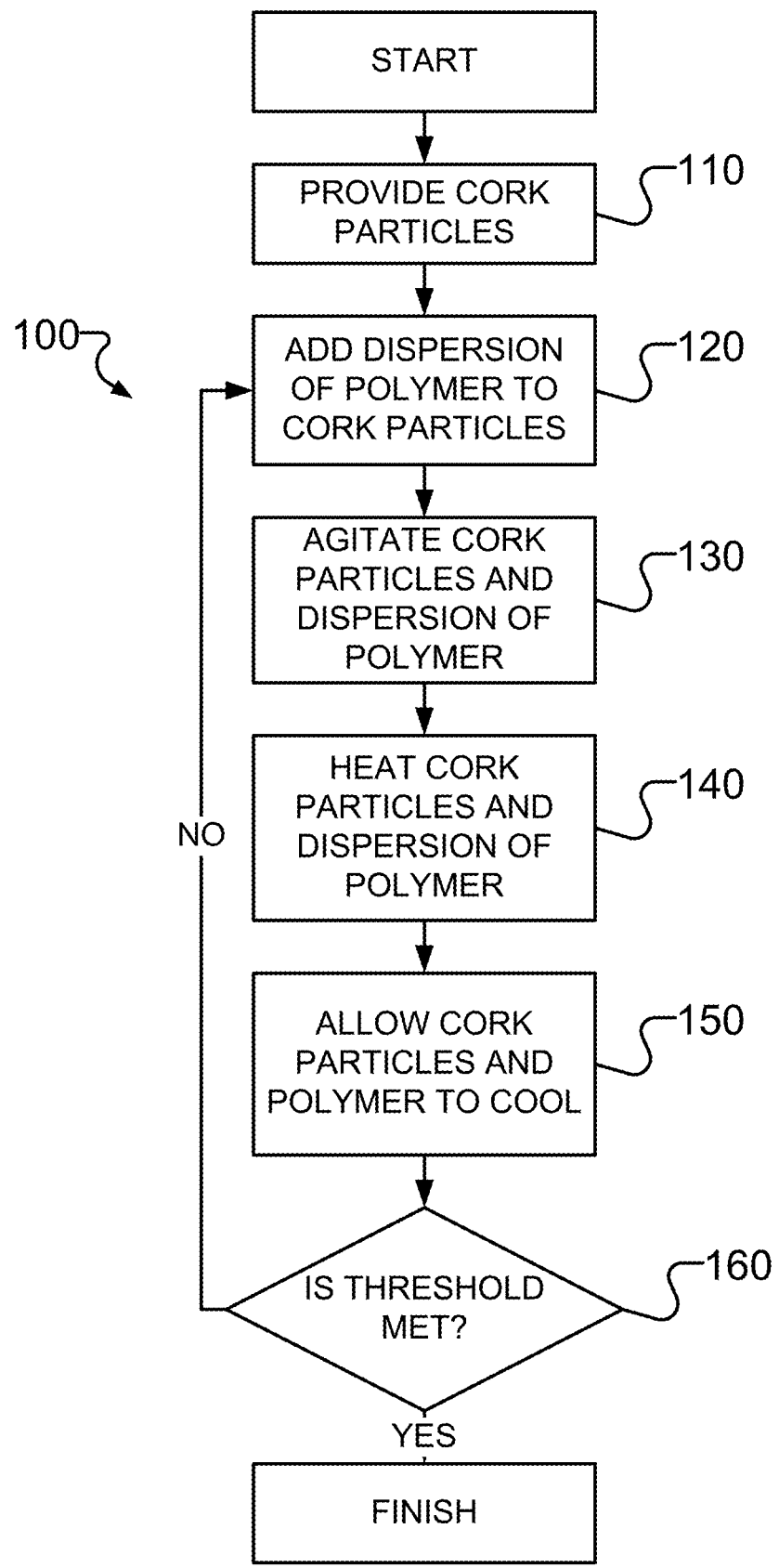
FIG. 2 is a flow chart of a method for manufacturing a cork composite material according to one exemplary embodiment of the invention.
Figure 3A:
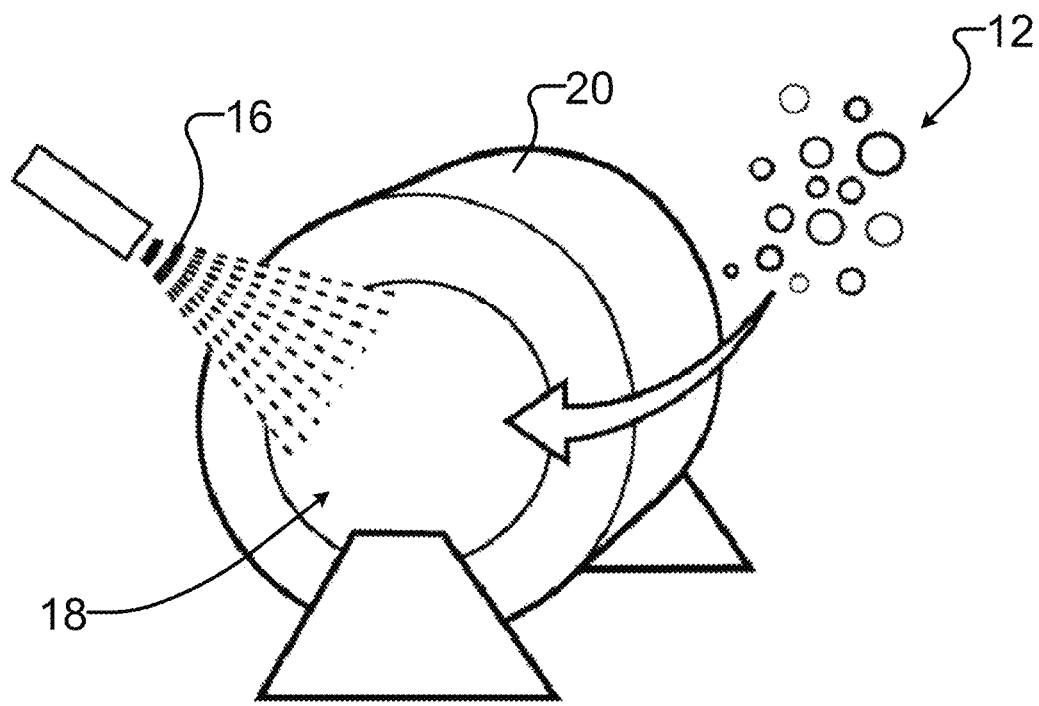
FIG. 3A is a schematic diagram of one or more steps of a method for manufacturing a cork composite material according to one exemplary embodiment of the invention.

FIG. 2 depicts a method 100 for manufacturing cork composite granules 10 according to a particular example embodiment. At step 110, cork particles 12 are provided. At step 110, cork particles 12 may be provided (e.g. introduced) into a volume 18. In some embodiments, volume 18 is defined by a cavity of a vessel 20, as schematically depicted in FIG. 3A. For example, vessel 20 may comprise a pan coating drum, cement mixing drum, some other form of rotating and/or pivoting drum and/or the like. Volume 18 may be defined (or partially defined) by at least one surface capable of supporting cork particles 12. For example volume 18 may be defined at least in part by the surface of a vessel 20 (e.g. as depicted in FIG. 3A), a tray, a conveyor belt and/or any other suitable surface. While method 100, as described herein, refers to a series of steps occurring in volume 18, that the specific instance of volume 18 may change throughout method 100. For example, it should be understood that one or more steps of method 100 could be implemented in one or more different volumes (concurrently or in sequence). For example, the contents of a volume 18 could be moved to a different volume 18 for one or more steps of method 100 or the contents of volume 18 could be split into multiple volumes 18 for one or more steps of method 100 (or vice versa).

In some embodiments, cork particles 12 may optionally be treated in step 110 and/or prior to step 110. Such pre-treatment steps are not expressly shown in FIG. 2. For example, in some embodiments, cork particles 12 may be washed with water (e.g. distilled water) or with alcohol (e.g. isopropyl alcohol). In some embodiments, cork particles 12 may be pre-treated with a surfactant to improve adherence between polymer 14 and cork particles 12. In some embodiments, cork particles 12 may be pre-treated to have a desired surface roughness, which may help to improve adherence between polymer 14 and cork particles 12. Such pre-treatment of cork particles 12 is not mandatory.

Cork particles 12 may comprise raw cork particles. For example, cork particles 12 may comprise a by-product of raw cork processing. Additionally or alternatively, cork particles 12 may comprise recycled cork.

Cork particles 12 can be of various sizes. In some embodiments, cork particles 12 have a longest dimension (maximal dimension), d, that is greater than 0.3 mm such that cork composite 12 benefits from the cellular structure of cork particles 12 which may not be present in particles of cork with maximal dimensions smaller than 0.3 mm. In some embodiments, cork particles 12 have a maximal dimension, d, that is between 0.3 and 3.0 mm. In some embodiments, cork particles 12 have a maximal dimension, d, that is between 0.3 and 1.2 mm. In some embodiments, cork particles 12 have a maximal dimension, d, that is between 0.5 and 1.0 mm. In some embodiments, at least 90% of cork particles 12 (by weight, volume or number of particles) have a maximal dimension, d, that is between 0.5 and 3.0 mm. In some embodiments, at least 90% of cork particles 12 (by weight, volume or number of particles) have a maximal dimension, d, that is between 0.5 and 1.0 mm. In some embodiments, at least 95% of cork particles 12 (by weight, volume or number of particles) have a maximal dimension, d, that is between 0.5 and 1.0 mm. In some embodiments, cork particles 12 are sorted by a sieve (e.g. a mechanical sieve) having circular openings each having a diameter of less than or equal to 1.0 mm or rectangular openings each having a diagonal corner-to-corner spacing of less than or equal to 1.0 mm. In some embodiments, cork particles 12 are sorted by a sieve (e.g. a mechanical sieve) having circular openings each having a diameter of less than or equal to 2.0 mm or 3.0 mm or rectangular openings each having a diagonal corner-to-corner spacing of less than or equal to 2.0 mm or 3.0 mm.

In some embodiments, cork particles 12 comprise low density cork. Cork particles 12 may have a density between 45 kg/m³ and 65 kg/m³. Cork particles 12 may have a density between 51 kg/m³ and 57 kg/m³. In some embodiments, at least 90% of cork particles 12 (by weight, volume or number of particles) have a density between 51 kg/m³ and 57 kg/m³. In some embodiments, at least 95% of cork particles 12 (by weight, volume or number of particles) have a density between 51 kg/m³ and 57 kg/m³.

In some embodiments, cork particles 12 have a humidity of between 5% and 11%.

At step 120, a dispersion 16 of polymer 14 is added into volume 18 where cork particles 12 are present to form a mixture of cork particles 12 and dispersion 16. Dispersion 16 of polymer 14 may be added to volume 18 in which cork particles 12 are present using a variety of techniques. In some embodiments, dispersion 16 of polymer 14 is sprayed (e.g. with a pressure sprayer) into volume 18, as shown in FIG. 3A.

In some embodiments, polymer 14 comprises or consists of a thermoplastic elastomer. For example, polymer 14 may comprise or consist of a styrene block co-polymer. In some embodiments, polymer 14 may comprise or consist of styrene-ethylene-butylene-styrene polymer. In some embodiments, polymer 14 comprises or consists of styrene-butadiene-styrene polymer, styrene-butylene-styrene polymer (e.g. RAPLAN™), styrene-ethylene-butadiene-styrene polymer, styrene-isoprene-styrene polymer, thermoplastic olefin polymer, thermoplastic polyurethane, some other suitable thermoplastic elastomer and/or combinations of such thermoplastic elastomers.

In some embodiments, polymer 14 comprises or consists of a bio-polymer. For example, in some embodiments, polymer 14 comprises or consists of a corn-based polymer, an algae-oil based polymer, an ethanol-based polymer, some other suitable bio-polymer and/or combinations of such biopolymers. In some embodiments, polymer 14 comprises or consists of a bio-polymer thermoplastic elastomer. In some embodiments, polymer 14 comprises or consists of Dryflex Green™, Terraprene™ some other suitable bio-polymer thermoplastic elastomer and/or combinations of such bio-polymer thermoplastic elastomers.

In some embodiments, polymer 14 is a soft-touch, matte finish, non-glossy or satin finish thermoplastic elastomer.

In some embodiments, polymer 14 is capable of elongation of between 200% and 300% of its original length before failure (e.g. breaking). In some embodiments, polymer 14 is capable of elongation of greater than 500% of its original length before failure (e.g. breaking). In some embodiments, polymer 14 is capable of elongation of greater than 1000% of its original length before failure (e.g. breaking). In some embodiments, polymer 14 is capable of elongation of greater than 1300% of its original length before failure (e.g. breaking).

In some embodiments, polymer 14 may be chosen based on desired characteristics of cork composite material 5. For example, polymer 14 may be chosen to tailor the durometer, elasticity, compressive strength, tensile strength, density, cushioning efficiency, energy return, impact absorption, vibration damping, durability, rigidity, molding temperature, etc. of cork composite material 5.

Dispersion 16 of polymer 14 may comprise any suitable dispersion. For example, dispersion 16 of polymer 14 may be a solvent-based (e.g. toluene-based) dispersion, an oil-based (e.g. mineral oil-based) dispersion and/or an aqueous-based dispersion. Dispersion 16 of polymer 14 may be fabricated in any suitable way. In some embodiments, an aqueous-based dispersion is employed for environmental reasons.

Dispersion 16 of polymer 14 may be manufactured by chemical processes or mechanical processes. For example, a non-limiting exemplary chemical process for manufacturing dispersion 16 comprises employing a solvent to dissolve polymer 14 such that polymer 14 can be mixed with water. The solvent may then be removed or stripped from the mixture to leave an aqueous-based dispersion. Alternatively, a non-limiting exemplary mechanical process for manufacturing dispersion 16 comprises using high shear dispersion mixing. Optionally, dispersion 16 of polymer 14 may be processed through an inline homogenizer for further particle size reduction and homogenization.

In some embodiments, an aqueous dispersion 16 of polymer 14 having a composition of between 40% and 60% water and between 40% and 60% polymer 14, by weight, may be employed. In some embodiments, an aqueous dispersion 16 of polymer 14 having a composition of between 45% and 55% water and between 45% and 55% polymer 14, by weight, may be employed. In some embodiments, an aqueous dispersion 16 of polymer 14 having a composition of approximately 50% water and 50% polymer 14, by weight, may be employed.

The amount of dispersion 16 of polymer 14 added to volume 18 containing cork particles 12 at step 120 may be dependent on various factors. For example, the amount of dispersion 16 of polymer 14 added to cork particles 12 at step 120 may be dependent on whether any of dispersion 16 of polymer 14 has already been added to cork particles 12, the desired composition of cork composite material 5, the temperature inside volume 18 or vessel 20, the moisture content of previous layers of polymer 14 added to cork particles 12, and/or the like. In some embodiments dispersion 16 of polymer 14 is added to cork particles 12 until cork particles 12 begin to clump together undesirably to form clusters.

Clusters may comprise a plurality of cork particles 12 grouped together and coated with polymer 14 as a whole instead of or in addition to being individually coated. Clusters may be formed at various steps of method 100. The occurrence of clusters 100 may be minimized by (automatically and/or manually) monitoring and regulating processing temperatures, material flow rates, moisture/humidity levels, etc.

In some embodiments, clusters are removed during method 100 (e.g. after or during one or more of steps 130, 140, 150) or at the end of method 100. For example, the final product of method 100 (or an intermediate product of method 100 at one or more of steps 130, 140, 150) may be passed through a mesh screen (or sieve) such that clusters are removed. In some embodiments, the mesh screen may have openings of 1.0 mm, 2.0 mm, 2.5 mm or 3.0 mm in diameter (circular openings) or in corner-to-corner diagonal dimension (rectangular openings). The size of the openings of the mesh screen may be dependent on the size of cork particles 12 employed in method 100 and the amount of polymer 14 coated on cork particles 12 during method 100. If clusters are removed at an intermediate step during method 100, it may be desirable to adjust amounts of the polymer 14 dispersion added at later steps and/or to add replacement granules 10 to volume 18 or vessel 20 to accommodate the clusters that are removed.

After being removed, clusters may be reprocessed, re-used and/or recycled as described further herein.

At step 130, the mixture cork particles 12 and dispersion 16 of polymer 14 is agitated. In some embodiments, the agitation of step 130 may start before step 120 such that cork particles 12 are agitated before and/or while dispersion 16 of polymer 14 is added. This is not mandatory. Step 130 could start during or after step 120. Cork particles 12 and/or dispersion 16 of polymer 14 may be agitated using various techniques. For example, volume 18 or vessel 20 may be rotated, vibrated, reciprocally pivoted and/or shaken to agitate cork particles 12 and dispersion 16 of polymer 14. Alternatively or additionally, a gas (e.g. air) may be forced to flow through volume 18 or vessel 20 to agitate the mixture of cork particles 12 and dispersion 16 of polymer 14. In the case where volume 18 is provided by a pan coating drum, the drum may be rotated or reciprocally pivoted to agitate the mixture of cork particles 12 and dispersion 16 of polymer 14. The agitation of the mixture of cork particles 12 and dispersion 16 of polymer 14 could end before step 140 or could continue through one or more of steps 140, 150 and 160. For example, in some embodiments, the mixture of cork particles 12 and dispersion 16 of polymer 14 is agitated continuously during method 100.

At step 140, the mixture of cork particles 12 and dispersion 16 of polymer 14 may be heated. Various heat sources may be employed to heat the mixture of cork particles 12 and dispersion 16 of polymer 14. For example, vessel 20 may comprise heating coils or may be located above heating coils, a burner or another suitable heat source. Alternatively, heated gas (e.g. air) may be forced to flow through volume 18 or vessel 20 using one or more blowers, fans and/or the like.

The mixture of cork particles 12 and dispersion 16 of polymer 14 may be heated to a temperature of at least 60° C. in some embodiments, at least 65° C. in some embodiments, or at least 70° C. in some embodiments. The mixture of cork particles 12 and dispersion 16 of polymer 14 may be heated to a temperature of between 60° C. and 75° C. in some embodiments. The temperature to which the mixture is heated may be dependent on the composition of polymer 14. For example, the temperature to which the mixture is heated may be dependent on the glass transition temperature and/or melting temperature of polymer 14. In particular, it may be desirable for the temperature to which the mixture is heated to be lower than the glass transition temperature of a hard phase of polymer 14. In some embodiments, it is desirable that a surface of vessel 20 itself (e.g. the surface that defines volume 18) not exceed the temperature of the mixture of cork particles and dispersion 16 of polymer 14.

As the mixture of cork particles 12 and dispersion 16 of polymer 14 is heated, water (or solvent) from aqueous dispersion 16 may evaporate thereby causing the humidity in volume 18 (e.g. in a cavity of vessel 20) to temporarily increase or remain relatively high. As the amount of water from aqueous dispersion 16 in the mixture of cork particles 12 and dispersion 16 decreases (and as moisture leaves volume 18), the humidity in volume 18 may decrease. The decrease in humidity in volume 18 may be an indicator that sufficient water from dispersion 16 has been removed from the mixture of cork particles 12 and dispersion 16. The removal of all or substantially all of the water from the mixture of cork particles 12 and dispersion 16 of polymer 14 may result in coated particles of cork 12 that are coated or encapsulated in polymer 14. In some embodiments, the mixture of cork particles 12 and dispersion 16 of polymer 14 is heated until all or substantially all water has evaporated from the mixture. In some embodiments, the mixture of cork particles 12 and dispersion 16 of polymer 14 is heated until the humidity in volume 18 or vessel 20 is below a threshold (e.g. 10%, 5%, 2% or 1% humidity) or at a threshold (e.g. 10%, 5% or 0% humidity). For example, a humidity sensor may be provided to determine the local humidity within volume 18 or vessel 20 and the heat source may be turned off or removed from vessel 20 when the humidity sensor reads that the humidity has arrived at or below the threshold.

At step 150, the coated particles of cork 12 are allowed to cool. In some embodiments, the coated particles of cork 12 are allowed to cool below 55° C. or below 50° C. In some embodiments, the coated particles of cork 12 are allowed to cool to a temperature between 40° C. and 55° C. In some embodiments, cork composite granules 10 are allowed to cool to room temperature. The coated particles of cork 12 may be allowed to cool using any suitable technique such as, for example, suitable passive techniques or suitable active techniques. In some embodiments, the coated particles of cork 12 are cooled by air flow through or in volume 18. In some embodiments, the coated particles of cork 12 are cooled by air flow while being agitated.

In some embodiments, an outer surface of each cork particle 12 of cork composite 5 is completely (e.g. 100%) covered, coated or encapsulated in polymer 14. In some embodiments, cork particles 12 are covered, coated or encapsulated in a plurality of layers of polymer 14 by repetition of steps 120 to 150 until a threshold is met at step 160. A layer may be defined as a discrete quantity of polymer 14 coated on a cork particle 12 during a single occurrence of steps 120 to 150. In some embodiments, individual layers are visually (and/or otherwise) discernable after method 100. In other embodiments, each of the plurality of layers is not visually (and/or otherwise) discernable from other layers. In some embodiments, cork particles 12 are covered, coated or encapsulated in between 5 and 12 layers of polymer 14. In some embodiments, cork particles 12 are covered, coated or encapsulated in between 10 and 20 layers of polymer 14. In some embodiments, cork particles 12 are covered, coated or encapsulated in a plurality of layers of different polymers 14. For example, each layer of polymer may comprise any one of the aforementioned polymers. Further, some inner layers of polymer (e.g. not the outermost layer of polymer of a granule 10) may comprise a thermoset polymer or another suitable polymer.

At step 160, it is determined whether: (1) a threshold is met and method 100 is complete; or (2) the threshold is not met and method 100 returns to step 120 to begin coating cork particles 12 in an additional layer of polymer 14. In some embodiments, the threshold at step 160 is based at least in part on a desired composition of cork composite material 5. For example, the block 160 threshold may be a desired composition of cork material 5 or a desired thickness of polymer 14 is coated on each cork particle 12.

In some embodiments, the block 160 threshold may be a cork composite material 5 composition of between 70% and 90% cork particles 12, by volume. In some embodiments, the block 160 threshold may be a cork composite material 5 composition of between 75% and 85% cork particles 12, by volume. In some embodiments, the block 160 threshold may be that a composition of cork composite material 5 is between 80% and 90% cork particles 12, by volume. In some embodiments, the block 160 threshold may be that a composition of cork composite material 5 is between 50% and 80% polymer 14, by weight. In some embodiments, the block 160 threshold may be that a composition of cork composite material 5 is between 70% and 80% polymer 14, by weight.

In some embodiments, the composition of cork composite material 5 employed for the block 160 threshold may be chosen based on desired characteristics of cork composite material 5. For example, the composition of cork composite material 5 may be chosen to tailor the durometer, elasticity, compressive strength, tensile strength, density, cushioning efficiency, energy return, impact absorption, vibration damping, durability, rigidity, molding temperature, etc. of cork composite material 5.

In some embodiments, the block 160 threshold may be that each cork particle 12 is coated in a thickness, t, of polymer 14. For example, such threshold thickness, t, of polymer 14 may be, for example, between 100 μm and 350 μm, 100 μm and 125 μm, 150 μm and 200 μm, 150 μm and 300 μm or 200 μm and 250 μm.

In some embodiments, a consistent amount of dispersion 16 of polymer 14 may be added to cork particles 12 at every occurrence of step 120 in method 100. This is not mandatory. In other embodiments, the amount of dispersion 16 of polymer 14 added to cork particles 12 may be variable for different occurrences of step 120 in method 100. In some embodiments, the amount of dispersion 16 of polymer 14 added to cork particles 12 may decrease (e.g. continuously or in a stepped manner) for subsequent occurrences of step 120 in method 100.

For example, in one exemplary non-limiting scenario it could be desirable to have 10 kg of cork composite material 5 having a composition of 70% polymer 14 and 30% cork particles 12, by weight. In this exemplary scenario, dispersion 16 of polymer 14 is 50% water and 50% polymer 14, by weight. In this exemplary scenario, 14 kg of dispersion 16 of polymer 14 is added to cork particles 12 to achieve the desired composition. Although 1.4 kg of dispersion 16 of polymer 14 could be added to cork particles 12 during each of ten repetitions of steps 120 to 150, this is not mandatory. For example, dispersion 16 of polymer 14 could be added to cork particles 12 according to the following schedule:

TABLE 1

Schedule of addition of polymer dispersion

| Occurrence of step 120 | Amount of polymer dispersion added |
|---|---|
| 1-3 | Between 8% and 12% of the total weight of dispersion 16 of polymer 14 (e.g. between 1.12 kg and 1.68 kg of the 14 kg of dispersion 16 of polymer 14) |
| 4-6 | Between 7% and 10% of the total weight of dispersion 16 of polymer 14 (e.g. between 0.98 kg and 1.4 kg of the 14 kg of dispersion 16 of polymer 14) |
| 7-9 | Between 6% and 9% of the total weight of dispersion 16 of polymer 14 (e.g. between 0.84 kg and 1.26 kg of the 14 kg of dispersion 16 of polymer 14) |
| 10-12 | Between 5% and 8% of the total weight of dispersion 16 of polymer 14 (e.g. between 0.7 kg and 1.12 kg of the 14 kg of dispersion 16 of polymer 14) |

This schedule could be followed until the entire total weight of dispersion 16 of polymer 14 (e.g. 14 kg) has been added and the threshold at step 160 is met. Notably, during a last occurrence of step 120, it is feasible that less than 5% of the total weight of dispersion 16 of polymer 14 could be added, depending on how much is left. However, it should be understood that while one example of a schedule of the amounts of dispersion 16 of polymer 14 added to cork particles 12 at each step 120 has been provided in Table 1, different schedules are feasible and likely. Specifically, any schedule of the amounts of dispersion 16 of polymer 14 added to cork particles 12 at step 120 may be dependent on the desired composition of cork composite material 5, the composition of polymer 14, the size of cork particles 12, the temperature inside volume 18 or vessel 20, the rate at which dispersion 16 of polymer 14 is added to cork particles 12, the degree of clumping observed, the amount of clusters removed from volume 18 during method 100, saturation points of the mixture, etc.

Figure 3B:
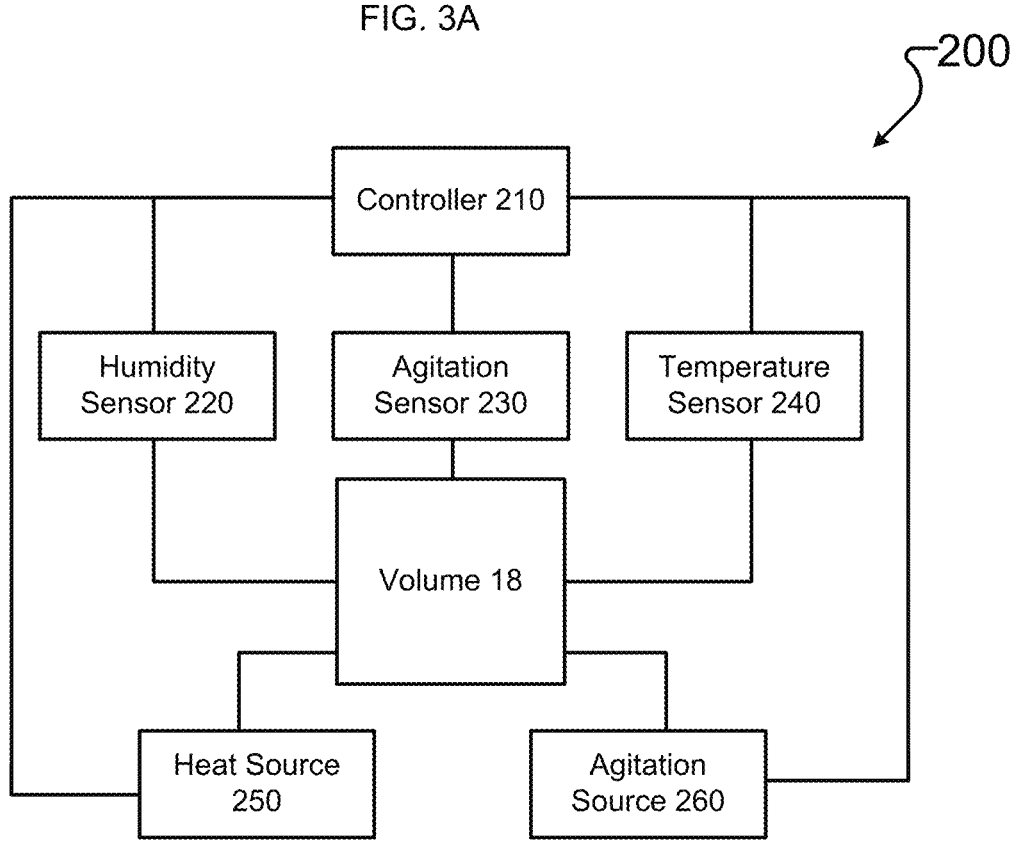
FIG. 3B is a schematic diagram of an automated system for implementing part or all of the method of FIG. 2.

Method 100 may be implemented manually, automatically or by some combination of manual and automatic processes. FIG. 3B is a schematic diagram of an automated system 200 for implementing part or all of the steps of method 100. System 200 comprises a controller 210. Controller 210 may receive feedback from a plurality of sensors connected to volume 18. For example, controller 210 may receive feedback from one or more of a humidity sensor 220 that monitors humidity in volume 18, an agitation sensor 230 that monitors physical agitation of volume 18 and a temperature sensor 240 that measures the temperature of the volume 18 (and/or cork particles 12 and/or granules 10 and/or dispersion 16). Controller 210 may process such feedback according to method 100 herein to provide commands to one or more of a heat source 250 to heat (or cool) the contents of volume 18 and an agitation source 260 to agitate the contents of volume 18 (e.g. to implement step 130). Although not depicted, in some embodiments, system 200 may include automated components for filtering out clusters, for pre-treating cork particles 12, for adding dispersion 16 of polymer 14 to volume 18, for allowing coated particles to cool, etc.

In some embodiments, at step 140, controller 210 may activate heat source 250 and monitor one or both of humidity sensor 220 and temperature sensor 240. If controller 210 determines that the humidity in volume 18 is at or below a threshold, controller 210 may signal to heat source 250 to turn off, in accordance with step 140 of method 100. As another example, controller 210 may monitor feedback from temperature sensor 240 at step 150 to determine if the mixture of cork particles 12 and dispersion 16 is sufficiently cooled. Similarly, controller 210 may determine if the step 160 threshold is met. If the step 160 threshold is met, controller 210 may cause an automated system to begin adding dispersion 16 to volume 18 according to step 120 or controller 210 may provide a visual and/or audible signal to an operator that dispersion 16 should be added according to step 120.

At the end of method 100, a plurality of cork composite granules 10 may be provided. Cork composite granules 10 may be processed to fabricate various structures. For example, cork composite material 5 may be employed (e.g. using suitable thermal molding techniques) for footwear (e.g. midsoles, insoles, outsoles, etc.), seat cushioning for furniture; sports equipment (e.g. bicycle seats, airless bicycle tires, bicycle handle grips, golf club grips, ski pole grips, tennis racket grips, racket balls, etc.), accessories (e.g. wrist bands, watch straps, belts, padding for backpacks, phone cases, padding or cushioning for wearable devices, etc.), headphones, goggles, glasses, etc. Cork composite material 5 may also be employed in the automotive industry or the aerospace industry.

In some embodiments, cork composite material 5 or cork composite granules 10 may be processed to fabricate various structures using heat molding, heated compression molding and/or the like. Beneficially, cork composite material 5 can be processed using such processing methods under similar conditions as traditional thermosets. Specifically, the inventors have observed that cork composite material 5 may be processed using existing standard production methods and equipment commonly used for the fabrication of latex and polyurethane based cork composites, with improved (e.g. reduced) temperature and heating cycle times relative to existing standard production methods and equipment commonly used for the fabrication of latex and polyurethane based cork composites.

For example, as schematically depicted in FIG. 4, a plurality of granules 10 comprising cork particles 12 encapsulated in polymer 14 may be inserted into a mold 24. By applying heat and/or pressure to granules 10 inside mold 24, a molded cork composite material 26 is formed. Molded cork composite material 26 may comprise cork particles 12 embedded in a polymer matrix 22 of polymer 14. The density of molded cork composite 26 and the associated properties (e.g. durometer, elasticity, compressive strength, tensile strength, cushioning efficiency, energy return, impact absorption, vibration damping, durability, rigidity/flexibility, molding temperature, etc.) of molded cork composite 26 can be varied by increasing or decreasing the mass of cork composite granules 10 placed in the mold. For example, by increasing the mass of cork composite granules 10 placed in the mold, the density and durometer of molded cork composite material 26 can be increased. Similarly, by decreasing the mass of cork composite granules 10 placed in the mold, the density and durometer of molded cork composite material 26 can be decreased.

Polymer matrix 22 and cork particles 12 may work together to provide cork composite material 5 with desirable properties. For reference, the following table provides typical material properties of raw cork and thermoplastic elastomers.

TABLE 2

Material Properties of Cork and Thermoplastic Elastomers

| Material Property | Cork | Thermoplastic Elastomer |
| --- | --- | --- |
| Tensile Strength (MPa) | 1-1.2 | 2-30 |
| Compressive Strength (MPa) | 1-26 | 2-38 |
| Elongation (%) | 6-8 | 50-1300 |
| Elastic Modulus (MPa) | 15-40 | 1-50 |
| Density (g/cm$^3$) | 0.05-0.24 | 0.7-1.1 |

Figure 5:
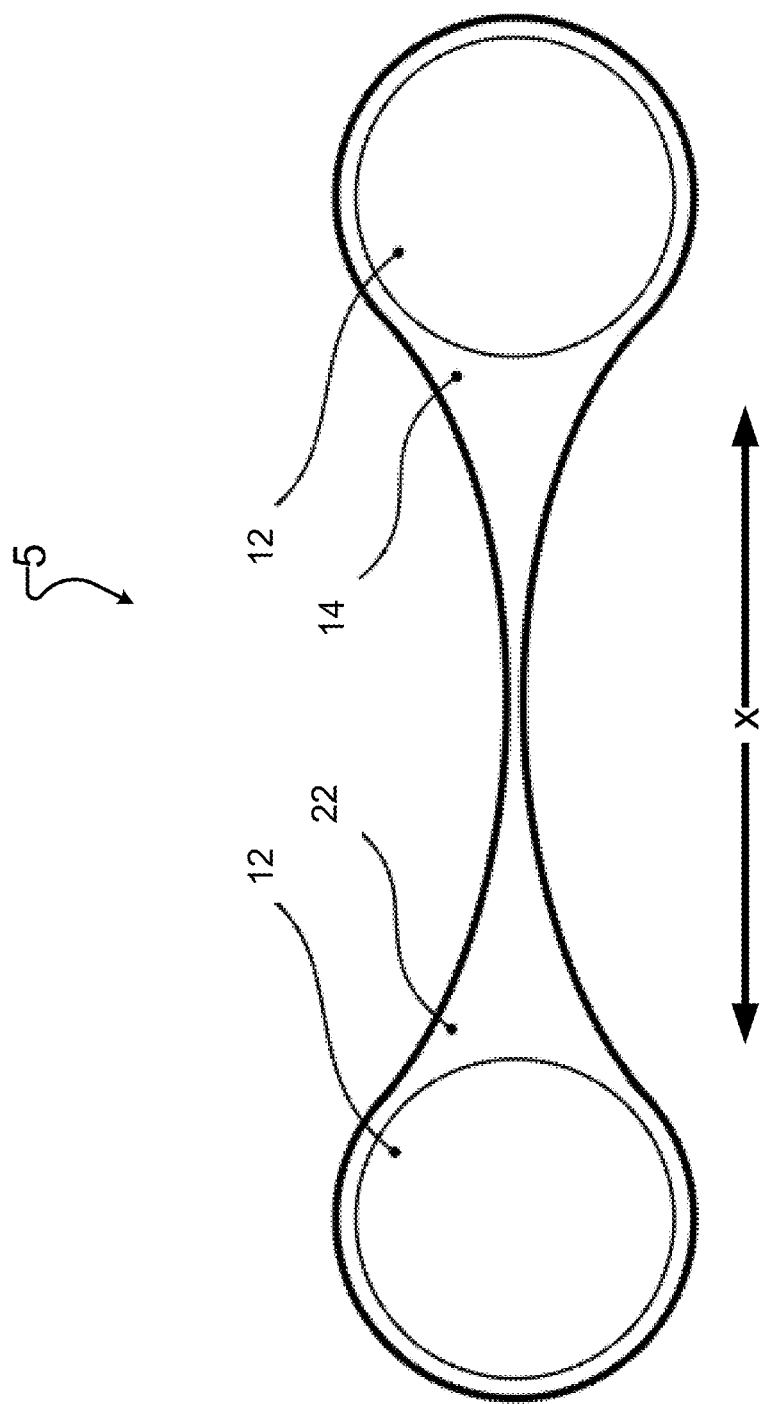
FIG. 5 is a schematic diagram of a cross-section of a cork composite material being stretched according to one exemplary embodiment of the invention.

Cork composite material 5 may exhibit a low density, good energy absorption, good compressive strength, desired aesthetics (e.g. a cork-like aesthetic) and/or good elasticity attributable at least in part to cork particles 12. At the same time, cork composite material 5 may exhibit good flexibility and durability attributable at least in part to polymer matrix 22. For example, as can be seen in FIG. 5, as cork composite material is stretched in the x-direction, polymer matrix 22, which has desirable elasticity characteristics (e.g. a relatively low elastic modulus and high elasticity as compared to natural cork), is stretched while cork particles 12 are not damaged.

Advantageously, cork composite material 5 (including undesirable clusters discussed herein) may be recycled and/or re-used. For example, by heating cork composite material 5 above the melting temperature of polymer 14, it may be possible to render cork composite material 5 back into cork composite granules 10 and/or re-mold cork composite material 5 as desired. Additionally or alternatively, by heating cork composite material 5 above the melting temperature of polymer 14 and agitating cork composite material 5 (e.g. using a centrifuge), it may be possible to mechanically separate cork particles 12 from polymer 14 as desired for recycling. Optionally, recycled cork particles 12 may be subjected to vacuum decompression and/or heat to reduce the density of such recycled cork particles 12.

It has been found that cork composite materials 5 made using method 100 are more flexible, more durable and softer than traditional cork composites and natural cork materials. Specifically, it has been found that cork composite materials 5 made using method 100 exhibit flexibility, durability and softness comparable to synthetic foam materials commonly used in footwear.

A third party testing company was hired to undertake some testing of initial specimens of cork composite material 5 and a variety of synthetic foams commonly used as midsoles of footwear. FIGS. 6 to 12B present results of such third party testing for cork composite material 5 specimens having durometers of 40 Asker C, 50 Asker C, 60 Asker C, 70 Asker C and 80 Asker C as well as a first EVA foam, PEBA foam, TPU foam and a second EVA foam.

Figure 6:
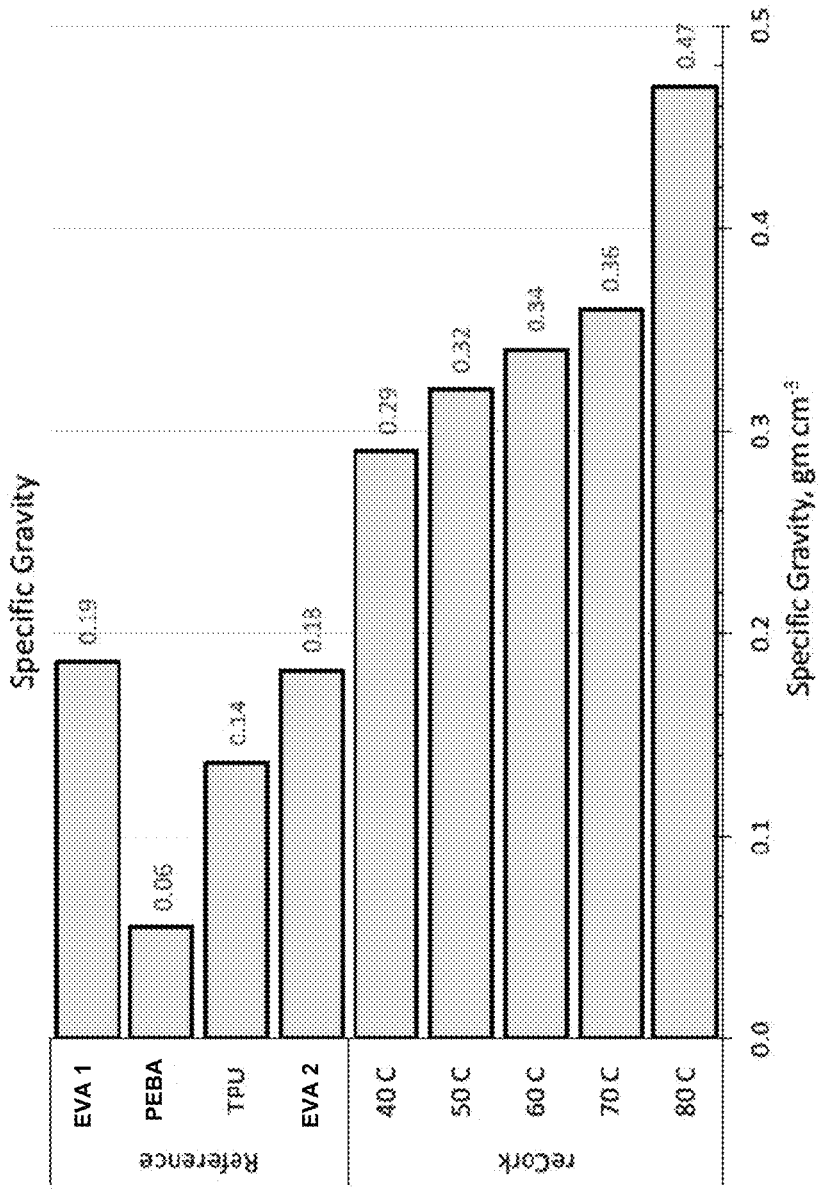
FIG. 6 is a bar chart showing the specific gravity of exemplary cork composite specimens and exemplary foam specimens as determined by third party testing.

FIG. 6 is a bar chart showing the specific gravity of each of the specimens. As can be seen from FIG. 6, the cork composite material 5 specimens (referred to in FIG. 6 as "recork") having higher specific gravities than the first EVA foam, PEBA foam, TPU foam and the second EVA foam (collectively referred to in FIG. 5 as "Reference" and subsequently referred to herein as the "reference foams").

Figure 7:
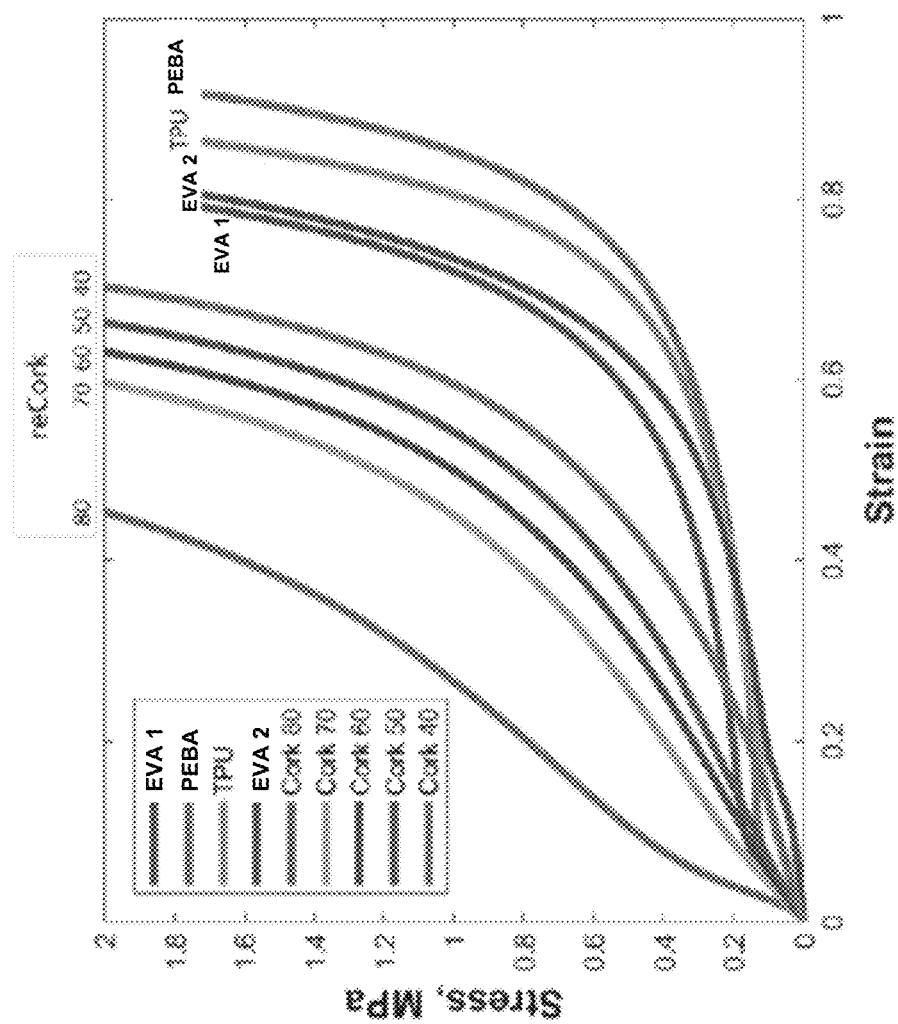
FIG. 7 is a stress-strain plot for exemplary cork composite specimens and exemplary foam specimens as determined by third party testing.

FIG. 7 shows a stress-strain plot for each of the specimens. As can be seen, the stress-strain curves of the cork composite material 5 specimens have similar shapes to the stress-strain curves of the reference foams. However, the stress exhibited by the cork composite material 5 specimens at a given strain is higher than that of the reference foams.

Figure 8A:
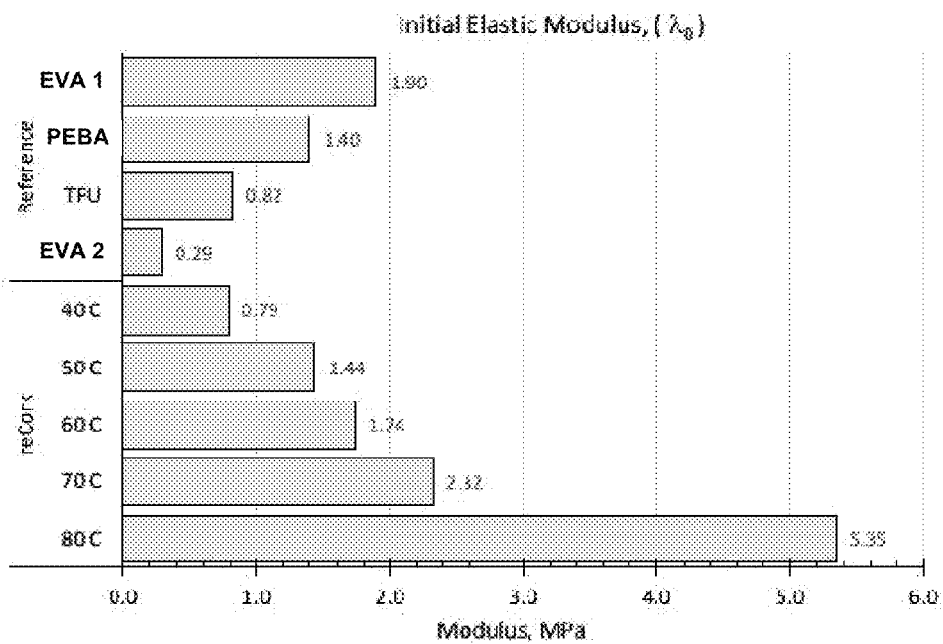
FIG. 8A is a bar chart of the initial elastic modulus, $\lambda_0$, for exemplary cork composite specimens and exemplary foam specimens as determined by third party testing.
Figure 8B:
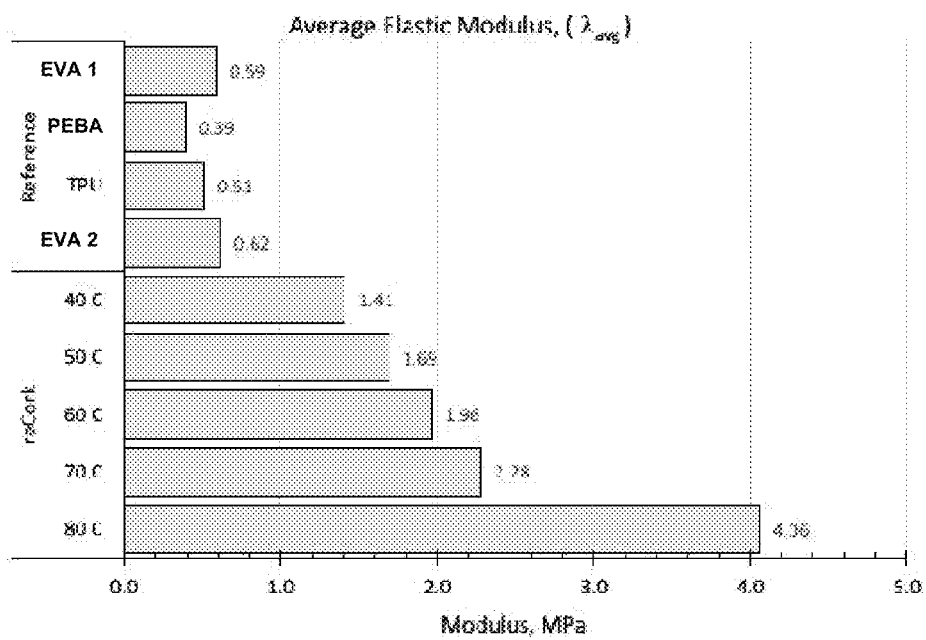
FIG. 8B is a bar chart of the average elastic modulus, $\lambda_{avg}$, for exemplary cork composite specimens and exemplary foam specimens as determined by third party testing.

FIG. 8A is a bar chart of the initial elastic modulus, $\lambda_0$, of the specimens. The initial elastic modulus is defined as the initial slope of the stress-strain curve in the low strain (linear elastic) range. As can be seen from FIG. 8A, the initial elastic modulus of the lower durometer cork composite material 5 specimens is comparable to that of the reference foams. FIG. 8B is a bar chart of the average elastic modulus, $\lambda_{avg}$, of the specimens. The average elastic modulus is defined as the average slope of the stress-strain curve up to the onset of densification.

Figure 9A:
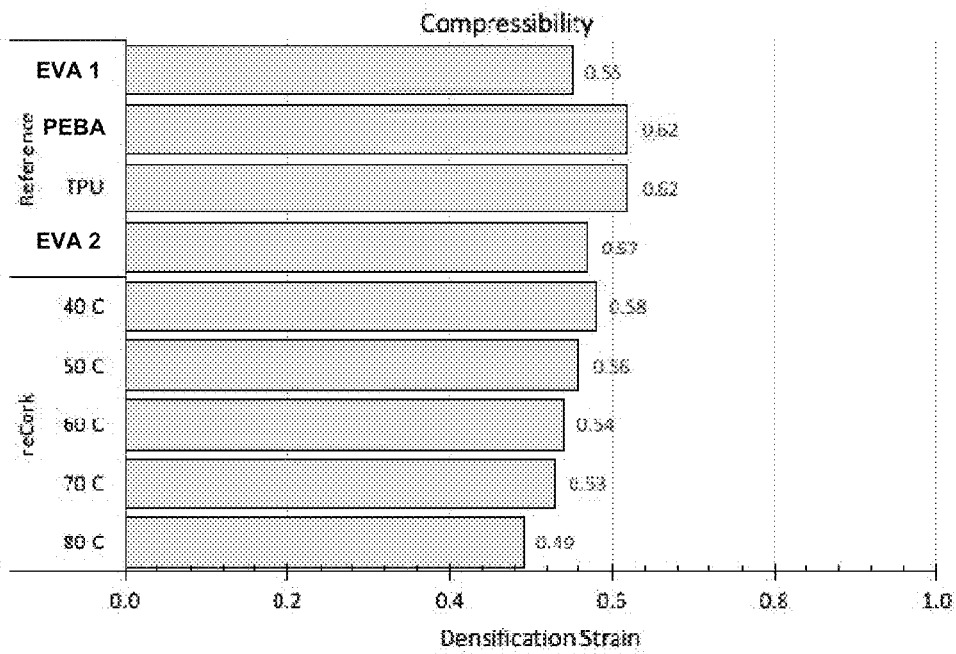
FIG. 9A is a bar chart of the compressibility of exemplary cork composite specimens and exemplary foam specimens as determined by third party testing.

FIG. 9A is a bar chart of the compressibility of the specimens. As can be seen from FIG. 9A, the compressibility of the cork composite material 5 specimens is comparable to that of the reference foams.

Figure 9B:
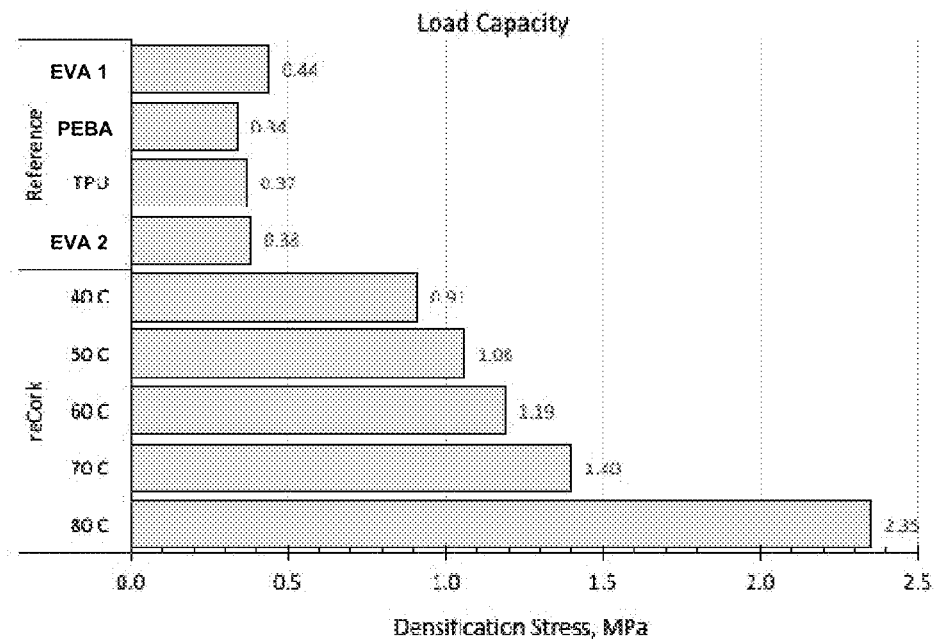
FIG. 9B is a bar chart of the load capacity of exemplary cork composite specimens and exemplary foam specimens as determined by third party testing.

FIG. 9B is a bar chart of the load capacity of the specimens. As can be seen from FIG. 9B, the load capacity of the cork composite material 5 specimens is higher than that of the reference foams.

Figure 10A:
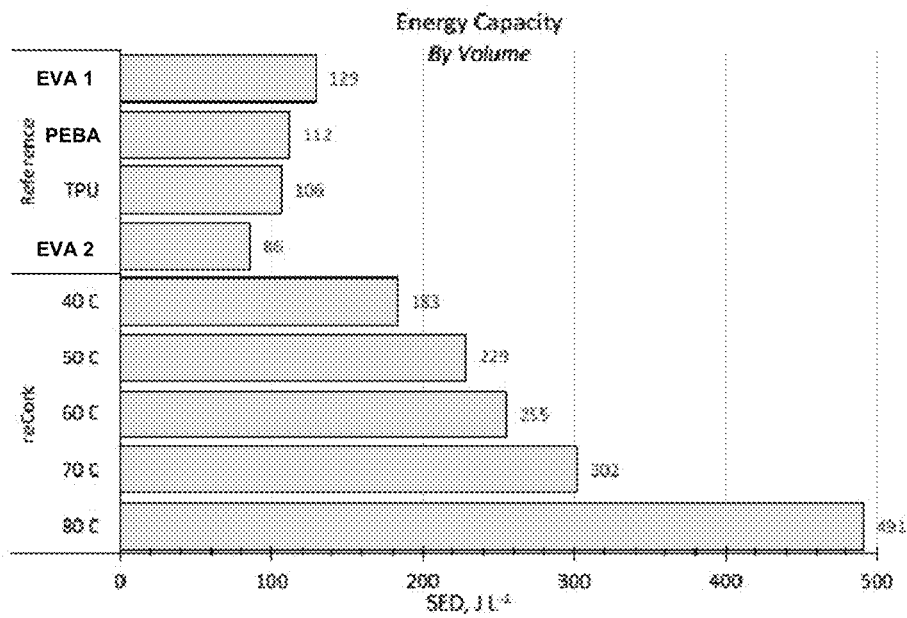
FIG. 10A is a bar chart of the energy capacity by volume of exemplary cork composite specimens and exemplary foam specimens as determined by third party testing.

FIG. 10A is a bar chart of the energy capacity by volume of the specimens. As can be seen from FIG. 10A, the energy capacity by volume of the cork composite material 5 specimens is higher than that of the reference foams.

Figure 10B:
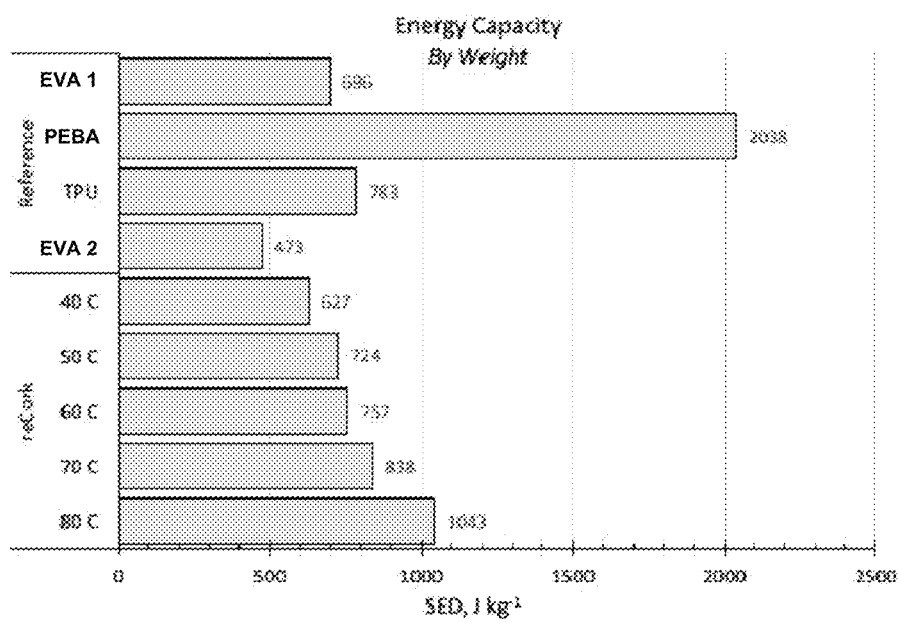
FIG. 10B is a bar chart of the energy capacity by weight of exemplary cork composite specimens and exemplary foam specimens as determined by third party testing.

FIG. 10B is a bar chart of the energy capacity by weight of the specimens. As can be seen from FIG. 10B, the energy capacity by weight of the cork composite material 5 specimens is comparable to that of the reference foams except for PBA foam.

Figure 11A:
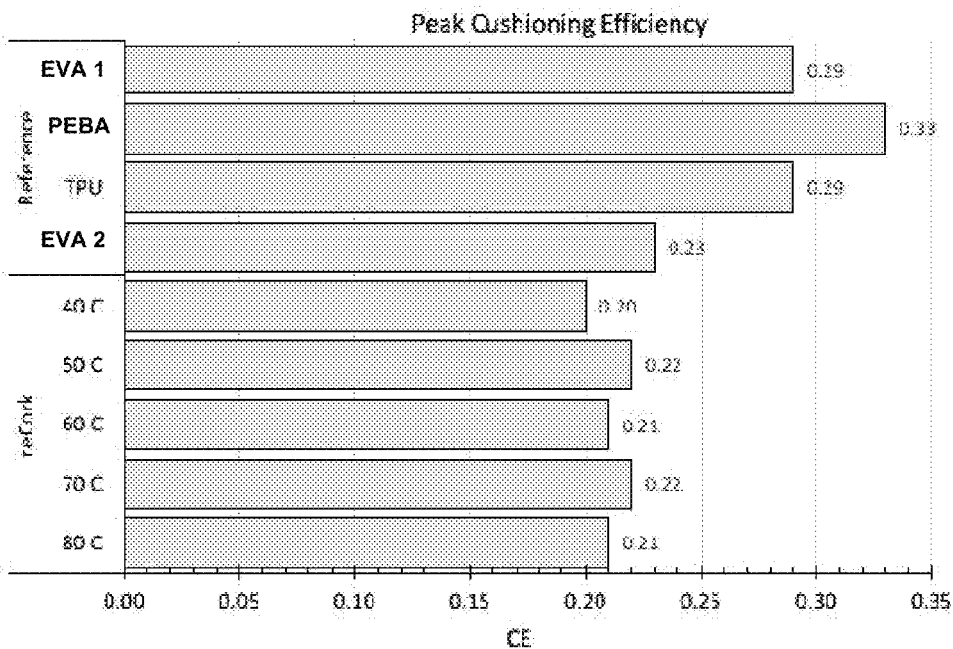
FIG. 11A is a bar chart of the peak cushioning efficiency of exemplary cork composite specimens and exemplary foam specimens as determined by third party testing.
Figure 11B:
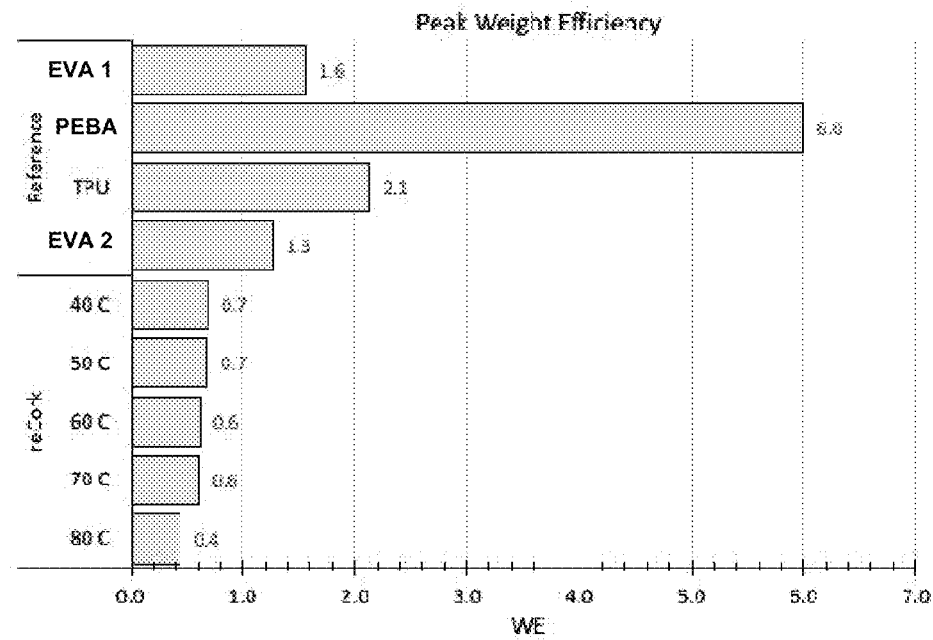
FIG. 11B is a bar chart of the peak weight efficiency of exemplary cork composite specimens and exemplary foam specimens as determined by third party testing.

FIG. 11A is a bar chart of the peak cushioning efficiency of the specimens. As can be seen from FIG. 11A, the peak cushioning efficiency of the cork composite material 5 specimens is comparable to that of the reference foams. Cushioning systems are required to absorb as much energy as possible while keeping the resulting loads as low as possible. Cushioning efficiency, as shown in FIG. 11A is defined as stress produced per energy absorbed. FIG. 11B is a bar chart of the peak weight efficiency of the specimens.

Figure 12A:
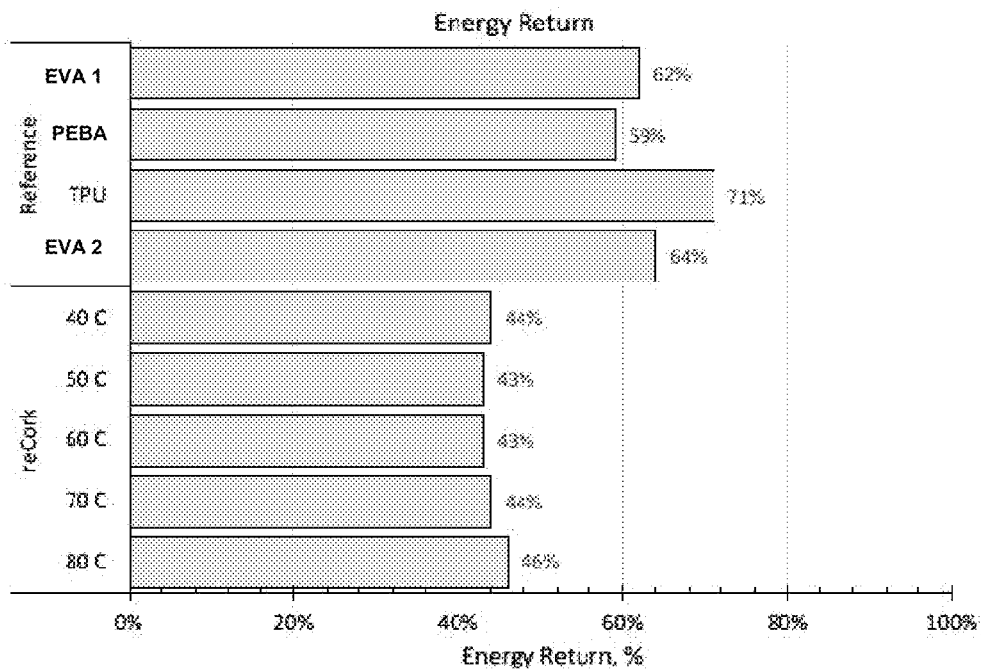
FIG. 12A is a bar chart of the energy return of exemplary cork composite specimens and exemplary foam specimens as determined by third party testing.
Figure 12B:
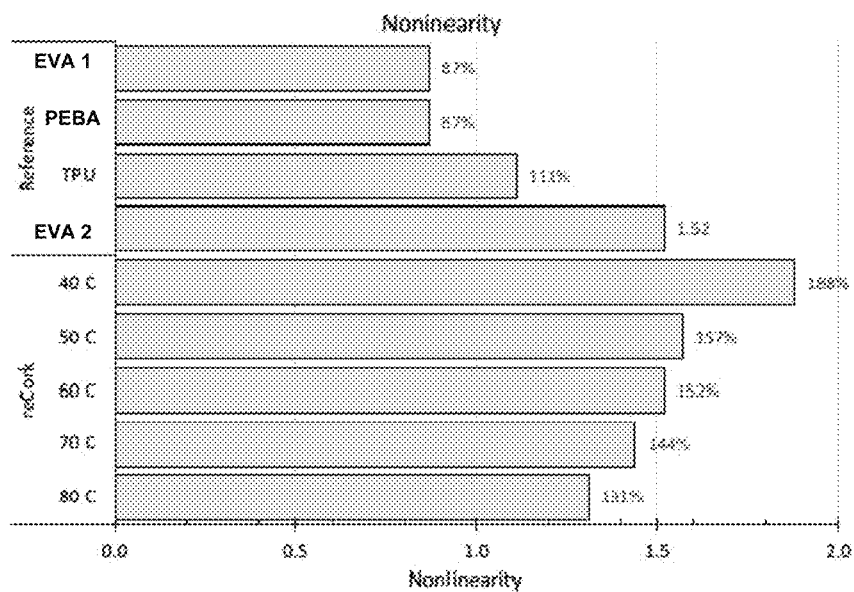
FIG. 12B is a bar chart of the nonlinearity of exemplary cork composite specimens and exemplary foam specimens as determined by third party testing.

FIG. 12A is a bar chart of the energy return of the specimens. The energy return is defined as the percentage of energy input that is returned as the material recovers or rebounds. FIG. 12B is a bar chart of the nonlinearity of the specimens. Nonlinearity is a descriptor of how the stiffness or elastic modulus of a material changes at different degrees of compression.

Optimal cushioning solutions for footwear may comprise materials that can be mapped or tuned to a specific application. In other words, there is not necessarily a single set of material properties that is ideal for all footwear cushioning solutions. Instead, it is desirable to be able to tailor a material to suit different cushioning solutions as necessary. As can be seen from FIGS. 6 to 12A, the various versions of cork composite material 5 tested exhibit similar but different characteristics. As such, by varying the density of cork composite material 5 as discussed herein, it is possible to tune the characteristics of cork composite material 5. In this way, cork composite material 5 may be tuned or mapped to provide optimal cushioning solutions to a variety of cushioning applications.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method of fabricating a cork composite material, the method comprising:
    (a) providing a plurality of cork particles in a volume;
    (b) adding an aqueous dispersion of thermoplastic elastomer to the volume to provide a mixture of the aqueous dispersion of thermoplastic elastomer and the cork particles;
    (c) agitating the mixture of the aqueous dispersion of thermoplastic elastomer and the cork particles;
    (d) heating the mixture of the thermoplastic elastomer and the cork particles; and
    (e) allowing the mixture of the thermoplastic elastomer and the cork particles to cool;
        wherein steps (a), (b), (c), (d) and (e) together result in a plurality of coated cork particles being coated in a first layer of the thermoplastic elastomer.

2. A method according to claim 1 wherein the plurality of coated cork particles comprise a plurality of individual coated cork particles.

3. A method according to claim 1 wherein each of the plurality of cork particles has a maximal dimension of between 0.5 mm and 2.0 mm.

4. A method according to claim 1 wherein the thermoplastic elastomer is selected from the group comprising styrene-ethylene-butadiene-styrene polymer and styrene-ethylene-butylene-styrene polymer.

5. A method according to claim 1 wherein the thermoplastic elastomer comprises a bio-polymer.

6. A method according to claim 1 wherein adding the aqueous dispersion of thermoplastic elastomer to the volume comprises spraying the aqueous dispersion of thermoplastic elastomer into the volume.

7. A method according to claim 1 wherein heating the mixture of thermoplastic elastomer and the cork particles comprises heating the mixture of the thermoplastic elastomer and the cork particles to at least 60° C.

8. A method according to claim 1 wherein heating the mixture of the thermoplastic elastomer and the cork particles comprises heating the mixture of the thermoplastic elastomer until the humidity in the volume is below 10%.

9. A method according to claim 1 wherein allowing the mixture of the thermoplastic elastomer and the cork particles to cool comprises allowing the mixture of the thermoplastic elastomer and the cork particles to cool below 55° C.

10. A method according to claim 1 wherein allowing the mixture of the thermoplastic elastomer and the cork particles to cool comprises actively cooling the mixture of the thermoplastic elastomer and the cork particles by blowing air into the volume.

11. A method according to claim 1 comprising continuing to agitate the mixture of the thermoplastic elastomer and the cork particles while heating the mixture of the thermoplastic elastomer and the cork particles.

12. A method according to claim 1 wherein adding the aqueous dispersion of thermoplastic elastomer to the to the volume to provide a mixture of the aqueous dispersion of the thermoplastic elastomer and the cork particles comprises adding the aqueous dispersion of thermoplastic elastomer to the volume at a ratio of between 1.25:1 and 5:1 cork particles to the aqueous dispersion of thermoplastic elastomer by weight.

13. A method for fabricating at least a portion of a midsole of a piece of footwear, the method comprising:
(a) providing a plurality of cork particles in a volume;
(b) adding an aqueous dispersion of thermoplastic elastomer to the volume to provide a mixture of the aqueous dispersion of thermoplastic elastomer and the cork particles;
(c) agitating the mixture of the aqueous dispersion of thermoplastic elastomer and the cork particles;
(d) heating the mixture of the thermoplastic elastomer and the cork particles;
(e) allowing the mixture of the thermoplastic elastomer and the cork particles to cool;
wherein steps (a), (b), (c), (d) and (e) together result in a plurality of coated cork particles being coated in a first layer of the thermoplastic elastomer; and
wherein the method further comprises:
introducing the plurality of coated cork particles into a mold to form at least a portion of a midsole of a piece of footwear;
applying pressure to the plurality of coated cork particles in the mold; and
applying heat to the plurality of coated cork particles in the mold.

14. A method of fabricating a cork composite material, the method comprising:
(a) providing a plurality of cork particles in a volume;
(b) adding a dispersion of thermoplastic elastomer to the volume to provide a mixture of the dispersion of thermoplastic elastomer and the cork particles;
(c) agitating the mixture of the dispersion of thermoplastic elastomer and the cork particles;
(d) heating the mixture of the thermoplastic elastomer and the cork particles; and
(e) allowing the mixture of the thermoplastic elastomer and the cork particles to cool;
wherein steps (a), (b), (c), (d) and (e) together result in a plurality of coated cork particles being coated in a first layer of the thermoplastic elastomer; and
wherein heating the mixture of the thermoplastic elastomer and the cork particles comprises heating the mixture of the thermoplastic elastomer and the cork particles to a temperature below a glass transition temperature of the thermoplastic elastomer.

15. A method according to claim 14 wherein the dispersion of thermoplastic elastomer comprises an aqueous dispersion of thermoplastic elastomer.

16. A method of fabricating a cork composite material, the method comprising:
(a) providing a plurality of cork particles in a volume;
(b) adding a dispersion of thermoplastic elastomer to the volume to provide a mixture of the dispersion of thermoplastic elastomer and the cork particles;
(c) agitating the mixture of the dispersion of thermoplastic elastomer and the cork particles;
(d) heating the mixture of the thermoplastic elastomer and the cork particles; and
(e) allowing the mixture of the thermoplastic elastomer and the cork particles to cool;
wherein steps (a), (b), (c), (d) and (e) together result in a plurality of coated cork particles being coated in a first layer of the thermoplastic elastomer;
wherein the method further comprises:
(f) adding a dispersion of thermoplastic elastomer to the volume to provide a mixture of the dispersion of thermoplastic elastomer and the coated cork particles;
(g) agitating the mixture of the dispersion of thermoplastic elastomer and the coated cork particles;
(h) heating the mixture of the thermoplastic elastomer and the coated cork particles; and
(i) allowing the mixture of the thermoplastic elastomer and the coated cork particles to cool;
wherein steps (f), (g), (h) and (i) together result in the plurality of coated cork particles being coated in a second layer of the thermoplastic elastomer.

17. A method according to claim 16 comprising repeating steps (f), (g), (h) and (i) for the plurality of coated cork particles until the cork composite material has a composition of the cork composite is between 60% and 80% thermoplastic elastomer by weight.

18. A method according to claim 16 comprising repeating steps (f), (g), (h) and (i) for the plurality of coated cork particles until the cork composite material has a composition of the cork composite is between 70% and 90% cork particles by volume.

* * * * *